May 21, 1963  O. K. KELLEY  3,090,474
TRANSMISSION
Original Filed Oct. 27, 1952  2 Sheets-Sheet 1
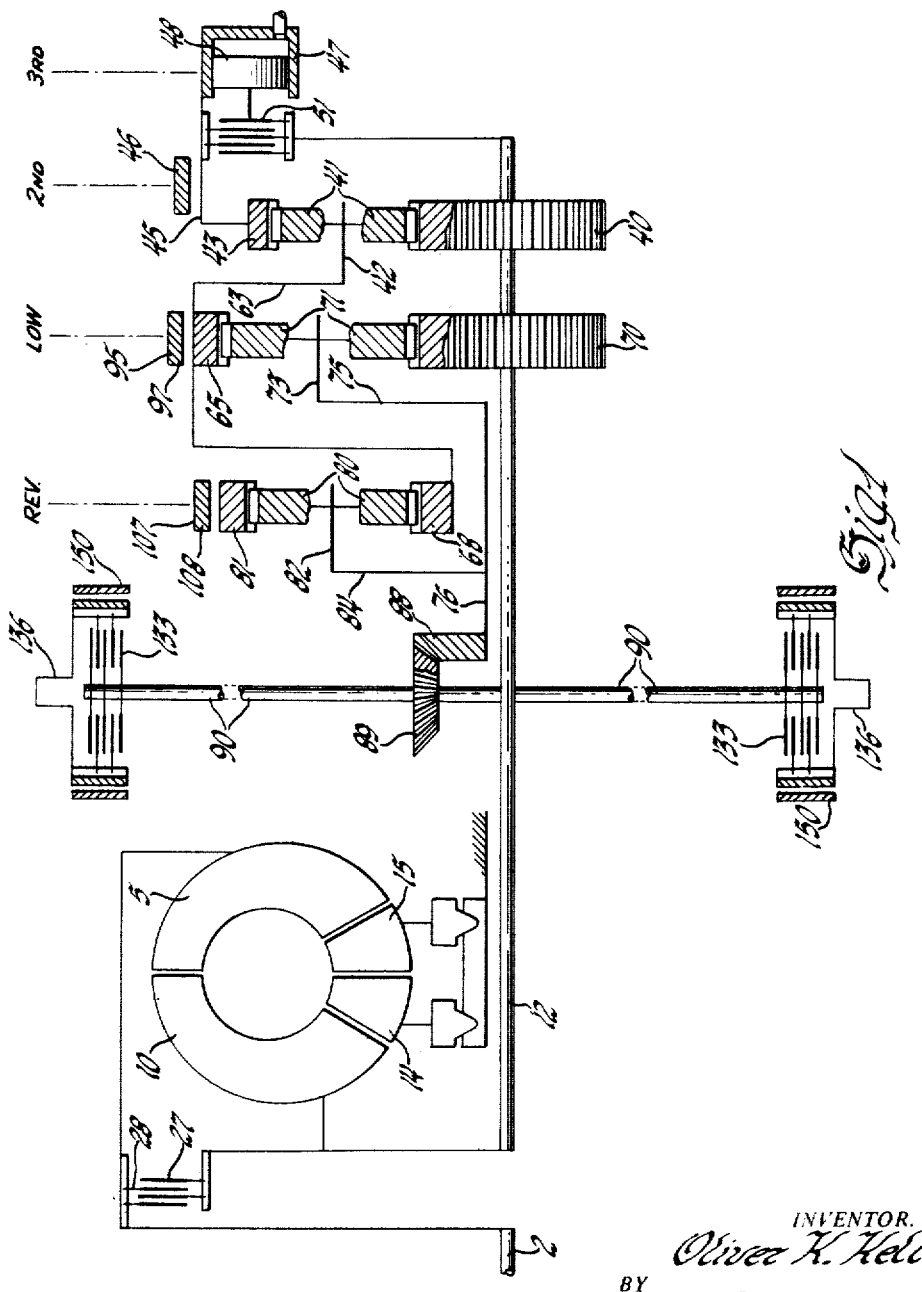
INVENTOR.
Oliver K. Kelley
BY
T. L. Chisholm
ATTORNEY

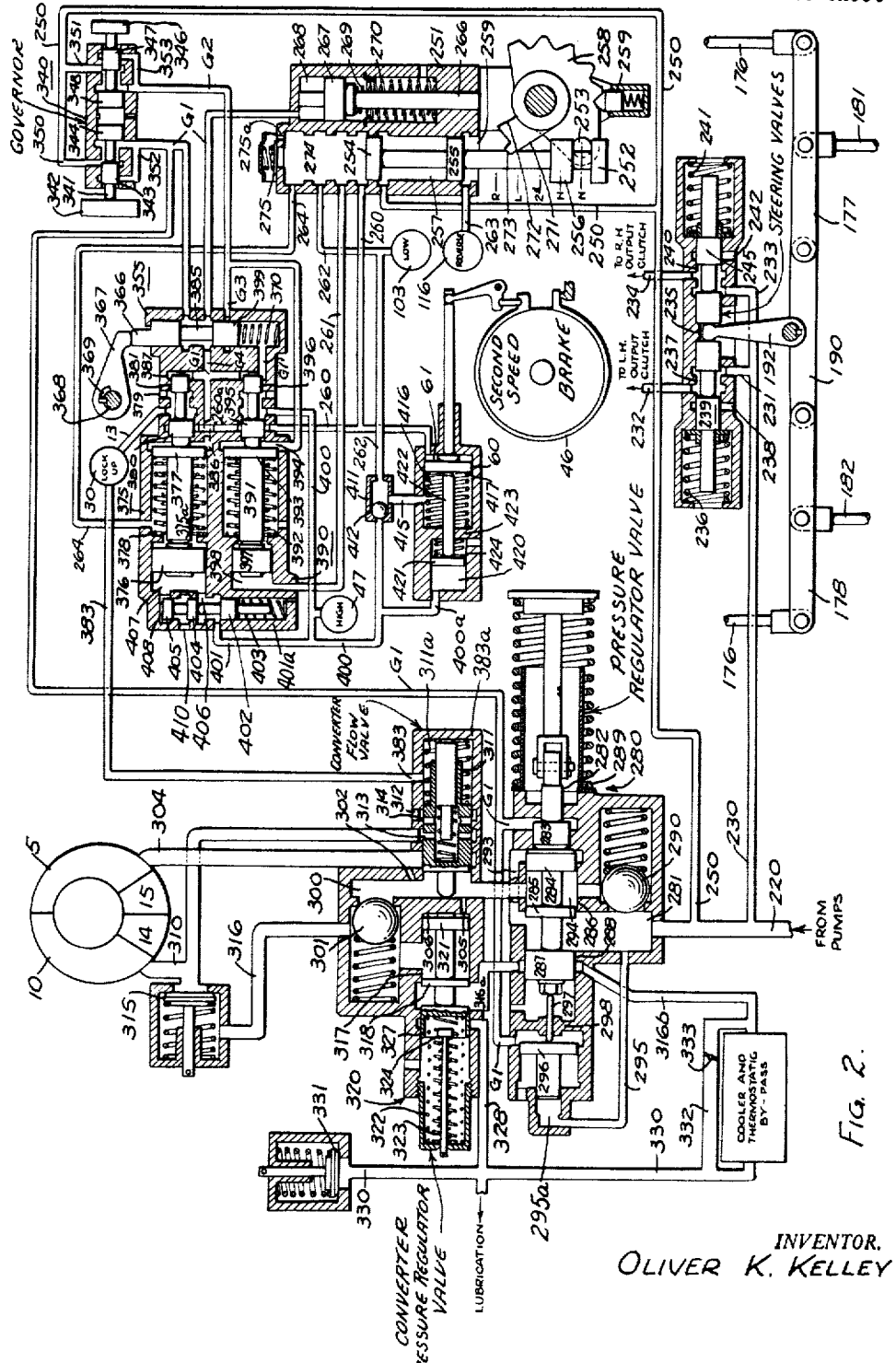

United States Patent Office 3,090,474
Patented May 21, 1963

3,090,474
TRANSMISSION
Oliver K. Kelley, Bloomfield Hills, Mich., assignor to General Motors Corporation, Detroit, Mich., a corporation of Delaware
Application Apr. 18, 1958, Ser. No. 731,569, which is a continuation of application Ser. No. 317,095, Oct. 27, 1952. Divided and this application Mar. 11, 1960, Ser. No. 14,328
5 Claims. (Cl. 192—85)

This application is a division of my application Serial Number 731,569, filed April 18, 1958, which is a continuation of my application, Serial Number 317,095 filed October 27, 1952, and abondoned.

This invention relates to automatic transmissions for automotive vehicles.

The transmission which is disclosed herein, as one example of the invention, is suitable for transmitting power for driving vehicles of the track laying type, for military or other purposes. In this respect the transmission disclosed herein is of a cross drive construction in that the torque output shaft extends crosswise of the vehicle for driving sprocket elements over which the endless tracks of the vehicle operate, but certain features of the invention are useful in any type of vehicle.

The objects of the invention include a hydraulic control system in which hydraulic medium is pumped under pressure through the torque converter and in which the discharge line from the torque converter is controlled by the pressure of the inlet line for the torque converter and thus excessive pressure in the inlet line of the torque converter cannot be built up. Moreover, the objects include a hydraulic system in which governor reduces main line, or pump pressure at normal vehicle speeds, which may be termed relatively high speed. Thus, in normal operation a relatively low pressure is maintained on the high side of the pump with resultant saving in power as well as wear on the parts.

These and other objects will be fully appreciated as the following detailed description is considered in conjunction with the accompanying drawings. The drawings show one form of transmission which embodies the invention.

FIG. 1 is a schematic representation of a transmission and final drive embodying one form of the invention, the transmission being shown as one-half of a longitudinal section which is symmetrical about its axis, and FIG. 2 is a diagram of the hydraulic control system.

As shown in FIG. 1 the transmission has a torque converter including an impeller 5 driven by an engine 2, a turbine 10 and reaction elements 14 and 15. The turbine 10 rotates a converter output shaft 12 which can be connected to the impeller 5 by a lock-up clutch 27—28 when it is desired to drive the shaft 12 directly from the engine. The converter output shaft is the input shaft for a planetary change-speed transmission including two input sun gears 40 and 70 driven by the shaft 12. The sun gear 70 meshes with planets 71 mounted on a carrier 73, 75 and meshing with a reaction ring gear 65 which may be held by a brake 95—97 operated by a fluid pressure motor 103 to drive the carrier forward at low speed. The carrier is connected to output shaft 76. The sun gear 40 meshes with planets 41 mounted on a carrier 42—63 and meshing with a reaction ring gear 43 which can be held by a brake 46 operated by a fluid pressure motor 61 to drive the carrier 42—63 forward when the brake 95—97 is released. This drives the ring gear 65 forward and thereby drives the carrier 73—75 forward faster than when the ring gear 65 is held, because sun gear 70 is also rotating. This effects second speed. This speed, or direct drive through the gearing, is established by locking up the planetary gearset 40—42—43 by a clutch 51 which can connect ring gear 43 to sun gear 40 when it is set by a piston 48 in a hydraulic cylinder 47.

Reverse is established by a third planetary gearset including an input sun gear 68 driven by the ring gear 65 and meshing with planets 80 mounted on a carrier 82—84 connected to the output shaft, and also meshing with a reverse reaction ring gear 81 which can be held by reverse brake 107—108, operated by a fluid pressure motor 116. When all other friction torque-establishing devices are released and the reverse brake 107—108 is set, forward torque on sun gear 70 drives ring gear 65 backward because the carrier 73—74—75 is initially held by the resistance of the output shaft 76, which is geared to the vehicle, as will be explained. Reverse rotation of ring gear 65 rotates sun gear 68 backward, which, when ring gear 81 is held, rotates carrier 82—84 backward to drive output shaft 76 backward.

A bevel drive gear 88 is keyed to output shaft 76 and meshes with bevel gear 89 keyed to cross shaft 90 which at each end has a final drive clutch 133 which can be engaged to rotate a final drive shaft 136. The clutches can be operated independently and the final drive shafts 136 can be separately or simultaneously retarded by brakes 150. The shafts 136 may drive tracks, and the vehicle can be steered by various combinations of clutching and braking.

One or more pumps represented by 210 in FIG. 1, driven whenever the engine is running, a pair of pumps 144L and 144R driven by the wheels whenever the vehicle is moving, supply oil under pressure to a main line 220 (FIG. 2) for control and cooling. A governor 340, which is a generator of pressure whose value is measured by the speed of the output shaft of the transmission also supplies control pressure.

The lock-up clutch 27—28 may be engaged by a piston 29 within a cylinder 30.

Automatic Control

The main pressure line 220 has a branch 250 which extends to a manual selector valve having a body 251 and a valve member 252 operable by a control member 253. This valve member has a head 254, a head 255 and a head 256. A groove 257 lies between heads 254 and 255. The valve may be shifted into one of five positions, as indicated by N, H, 2nd, L, R. The selector valve has an open end forming an exhaust port 259. It is shown in the neutral position in which main line 250 is blocked by heads or lands 254, 255. The next higher position is for high range automatic operation of the transmission in second and third-speed ratios; the next higher position locks the transmission in second speed ratio; the next higher position locks the transmission in the low speed ratio; the next higher position is for reverse. The valve body is connected to a pressure line 260 for the second and high speed ratios, to the pressure line 261 for the second speed ratio only, to the pressure line 262 for the low speed ratio, and to the pressure line 263 for reverse. The body has a line 264 connecting to a lock-up clutch valve 375. A segment 258 and a spring-pressed detent 259 holds the valve member in a selected position.

Associated with the manual control valve is a speed-responsive downshift inhibitor in the form of a plunger 266 with a piston 267 which can be moved down by governor pressure in the cylinder 268 against the force of a return spring 269 far enough to engage a secondary spring 270.

This inhibitor can cooperate with a stop 271 having an abutment face 272 and an abutment face 273 to prevent downshift movement of the manual valve operator 258 when the car is moving above a predetermined speed, as will be explained. The chamber 274 of the manual valve has a discharge port controlled by check valve 275 and a small bleed port 275a not controlled by the check valve.

The main presure regulator is indicated generally at 280 and the main pressure line 220 connects into a regulated pressure chamber 281 thereof. The pressure regulator valve includes a valve stem 282 urged to the right by spring 289. The stem includes a governor piston 283, a main regulating land or piston 284, a converter charging land 285 functioning in a converter charging port 286 and a maximum pressure land 287 functioning in a maximum pressure relief port 288. The regulated pressure chamber 281 has a pressure relief valve 290 discharging ultimately to the torque converter and has a passage 293 leading to a pressure-regulating chamber on the right of land 284, while the port 286 lies between the regulated pressure chamber 281 and a reduced pressure converter supply chamber 294. To maintain high pressure at low speed, passage 295 extends from the regulated pressure chamber 281 to a low speed booster chamber 295a on the left of the small end of a piston 296 so that pressure in chamber 295a can urge the valve stem 282 to the right to increase pressure in the main line through a pin 297 slidable in end wall 298, when this is permitted by low governor pressure in the chamber between the large end of piston 296 and end wall 298, as will be explained. Leading from the chamber 294 is a reduced pressure torque converter supply passage 300 provided with a relief valve 301 and also provided with a restricted converter supply port 302 leading to the converter inlet passage 304. A second restricted passage 305 connects the converter supply passage 300 with a cylinder 306 of a converter pressure regulator valve.

As is known to those versed in the art, a circulation of oil is maintained in the converter particularly when it is used to transmit torque and the oil from the converter discharges into a passage 310 which leads to a converter flow valve 311 having an exhaust port 312. The flow valve 311 is urged by a spring 311a to the inlet end of the conduit 304 and in this position it has ports 313 and 314 which connect the converter discharge conduit 310 with the exhaust 312.

In the converter discharge passage 310 is a pressure relief valve 315 which can connect to the discharge line 316. The line 316 continues past the relief valve 301 into the cylinder 306 which can discharge to a cooler and lubricating lines through a port 317 controlled by a head 318 on the stem of a converter regulator and cooler by-pass valve generally indicated at 320 which stem is urged to the left by a head 321 acted upon by liquid entering the cylinder 306 and is normally urged to the right as FIG. 11 is viewed by a primarily acting coil spring 322 and a secondary spring 323 which backs up a headed member 324. This valve stem also has a head 327 operating in a port lying between a passage 316a and a lubricant passage 328 which leads directly to a transmission lubricant line 330. This lubricant line has a pressure relief valve 331 to maintain a relatively low pressure therein. The line 316a continues around the head 287 and into line 316b where it enters the cooler which discharges into the lubricant line 330. There is a by-pass 332 extending around the cooler which may be controlled by a valve 333.

For controlling changes of ratio there is an output shaft driven governor 340 which may be of known construction, such as the governor in FIG. 5 of the Thompson U.S. Patent 2,204,872. The governor is rotated in any suitable manner by the output sleeve 76. A low speed valve 341 is urged out or to the left as FIG. 2 is seen by a relatively large centrifugal weight 342 and is urged in by the pressure on a large land 344 of oil in passage $G_1$ to which oil is admitted from passage 350 (connected to main line 250) under the control of small land 343. The pressure in passage $G_1$ is maintained as a function of governor speed jointly by the admission of oil from line 250 and exhaust of oil through passage 352 as is known. Likewise, a lower pressure at a given speed of rotation is maintained in high speed passage $G_2$ by high speed valve 345 urged outward by a small weight 346 and urged inward by pressure on head 348 maintained jointly by admission of oil from line 351 (connected to main line 250) and exhaust of oil through passage 353 both under control of land 347.

There is a throttle actuated valve 355 with a grooved valve stem 366 which can be urged down, as FIG. 2 is seen, by an arm 367 fixed to the engine throttle shaft 368 through a loose or lost motion connection illustrated at 369. The stem 366 is urged up by a spring 370. The pressure line $G_1$ passes through this valve as shown to shift control valves to be described and to the downshift inhibitor 251. Pressure line $G_1$ also goes to the main pressure regulator valve to urge the head 283, and the head 296 to the left, tending to reduce main line pressure.

There is a converter lock-up clutch valve generally indicated at 375, having a valve stem 375a which can be urged to the right by a piston 376 under the influence of control pressure, as will be explained. The stem 375a has a piston 377 and a relatively large land 380 and a relatively small land 381, all urged to the right by spring 378. The lock-up clutch release line 264 can conduct line pressure from the manual valve 252, when in reverse, to the space at the left of piston 377 to prevent the engagement of the lock-up clutch, as will be explained. The second and high speed pressure line 260 has a branch 260a which leads into the lock-up valve at the location of land 380 and is normally closed thereby. Leading from the lock-up clutch valve 355 is the line 13 in the converter output shaft 12, which extends to the cylinder 30 of the lock-up clutch. The valve has an exhaust port 379. Extending from the cylinder 30 of the lock-up clutch to the converter flow valve 311 is a line 383 which restricts flow through the converter when the lock-up clutch is engaged, as will be explained.

The pressure line $G_1$ passes around neck 385 in the throttle actuated valve 366 and thence to chamber 386 in the lock-up clutch valve 355 so as to act upon the piston 377 to open the valve and engage the clutch at high vehicle speed as will be explained. The line $G_1$ also has a branch which passes into a chamber 387 in the clutch lock-up valve to act upon the head 381 thereof.

There is a gear shift valve generally indicated at 390, having the valve member 391 urged closed, or to the right by springs 392 and it has a governor piston 393 adjacent a governor chamber 394. It also has a land 395 at the location where the line 260 enters the shift valve and a smaller land 396, defining a governor ($G_1$) pressure chamber.

The shift valve can be held closed to prevent upshifting of the planetary gearset by control pressure at the left of a piston 397 in a third speed lock-out chamber 398 which can be supplied with oil at main line pressure by line 261 from chamber 274 of the manual valve 252 when in second speed position marked $2^d$. The pressure in line $G_1$ tends to open the shift valve by acting upon the head 396. The line $G_1$ also extends into the throttle actuated valve on the underside of the head 399 thereof.

The line $G_2$ extends to the throttle actuated valve and into the upshift chamber 394 of the shift valve 390.

There is a high clutch actuating line 400 which connects into the shift valve between the two heads 395 and 396 and when the shift valve is open this line 400 fills the high clutch cylinder 47. From the high clutch cylinder 47 line 401 leads to a pressure-limiting valve 401a for urging the lock-up clutch valve 375 closed with a limited force. The pressure-limiting valve has a valve stem with a head 402 urged closed by a spring 403. The stem also has a head 404 and a head 405. The limiting valve has a port 406 which leads from line 401 into a cylinder 407 in which the piston 376 is disposed. Connected to the cylinder 407 is a pressure-limiting chamber 408 disposed above land 405. The pressure-limiting valve has an exhaust port 410.

The pressure-limiting valve is a regulator valve in which the pressure in chamber 407 passes into chamber 408 and urges head 405 down against the force of spring 403. Thus, an excessively high pressure in the chamber 407 causes the head 404 to close inlet port 406 and to open exhaust port 410 and the pressure in chamber 407 is thus limited by the force of spring 403.

The line 400 also leads to a shuttle valve having a body 411 with a ball valve 412 therein. The line 262 for the low speed range also extends to the shuttle valve on the opposite side of the ball member 412. A passage 415 connects the interior of the shuttle valve with a second speed release chamber 416 in the cylinder 61 on the left side of the piston 60. The piston 60 is urged in the band-releasing direction by a spring 417. A branch 400a of the high clutch line 400 connects into a second release cylinder 420 in which there is a piston 421 with a piston rod 422 extending through the end 423 of the cylinder 420 to engage the piston head 60. A spring 424 acts upon the piston head 421.

*Operation of Control*

Assume that the engine is idling with the manual valve in the position N shown in FIG. 2 which is neutral. The main input pump 210 is pumping oil into the high pressure line 220 and its branches 230 and 250. The oil under pressure flows to the manual valve, but is prevented by piston heads 254 and 255 from actuating any of the clutches or brakes which could establish drive through the gearing. The oil from the main inlet pump 210 passes into chamber 281 of the main pressure regulator valve 280 and through passage 293 to the right side of the head 284. This urges the valve stem 282 to the left and, at a pressure determined by the spring 289, causes the head 285 to crack port 286 so that oil enters the chamber 294 and converter supply chamber 300, from which a limited amount of oil may initially pass through the port 302 into the inlet 304 of the torque converter, and discharge from the torque converter outlet line 310 through ports 313 and 314 to exhaust port 312. At this time the pressure in the converter may be relatively low and the rate of flow through the converter is minimized. This depends on idling speed of the engine, viscosity of the oil, capacity of the pump 210 and leakage from the system. Ordinarily at idling speed, the pump 210 maintains normal converter pressure, as it must to assure lubrication of the planetary gears, as will be explained. As converter pressure becomes established in chamber 300 by the main regulator valve 282, the pressure moves the converter flow valve 311 to the right, closing the converter outlet at port 313 and opening the communication between chamber 300 and the converter inlet 304. The oil under converter pressure also enters the cylinder 306 through restricted passage 305 and moves the converter regulator and by-pass valve 318 to the left opening port 317. Oil at converter pressure lifts the check valve 315 off its seat and flows through pipe 316 and open port 317 to the lubricating passage 316a from which it flows around land 287 of the main regulator valve and through the cooler to the lubricating line. It is obviously necessary for the converter regulator valve 318 to open port 317 in order to supply any lubricating fluid to the various bearings and gearing, which must be kept lubricated whenever the engine is running, because shaft 12 and all the gears are turning.

It will be noted that the outlet for the converter is controlled by the pressure on the inlet side. With this arrangement undue pressure cannot be built up within the converter. Should the cooler become clogged, that is tending to build up the pressure, the converter outlet regulator valve shifts further to the left due to the built up pressure in chamber 306 and the head 327 will then open the passage 316a to a by-pass line 328 which leads directly to the lubrication line 330. The normal maximum opening of the converter outlet regulator valve is determined by the spring-pressed head 324. Clogging of the cooler will raise the pressure and then the converter outlet regulator valve member will shift further to the left against the spring 323 thus opening the port 317. Thus the mechanism will continue to operate if for some reason the cooler is clogged or otherwise cut out of the system. Also, if necessary, if the cooler becomes defective, disabled or clogged the valve 333 may be opened for bypassing the oil around the cooler through line 332.

Oil at main line pressure enters through line 295 into the chamber 295a at the left end of the pressure regulator to urge the piston 296 to the right. The main pressure regulator valve member is thus urged in opposing directions, namely by the oil under pressure back of piston 284 which tends to decrease line pressure and by the pressure acting on piston 296, assisting spring 289 to increase pressure.

To drive the car in automatic range the operator shifts the manual control valve one notch upwardly into the H position for second and high speed ratios. The groove 257 now connects the pressure line with the line 260 which leads to the cylinder 61 for second speed apply piston 60; it runs through the shift valve 390 and to the lock-up clutch valve 380. The oil under pressure flows to the chamber 61, shifts the piston 60 to the left and contracts the second speed clutch band 46 on the member 45 and conditions the gearing to transmit torque through the second speed ratio. If the throttle is opened enough for the engine to develop sufficient torque we now have the vehicle moving and the governor valve is being rotated. When sufficient car speed is attained the low speed governor valve 341 has raised the pressure in the line $G_1$ high enough to shift the lock-up clutch valve 375a to the left as FIG. 2 is viewed, which connects the pressure line 260a to the lock-up clutch line 13 so that the oil is conducted to the lock-up clutch cylinder 30 and the lock-up clutch begins to engage. The line 383 extends from the lock-up clutch cylinder 30 to the space in cylinder 383a at the right of converter flow valve 311 entering through port 383. As the lock-up clutch engages the converter flow valve is shifted to the left, thus reducing supply of oil to the converter to the minimum flow of oil through port 302. This is done because the torque is now transmitted directly through the lock-up clutch and not through the converter. Of course, governor valve 345 may open line $G_2$ to the pressure line 250 but this maintains a lower pressure in $G_2$ than the pressure in the line $G_1$.

As the vehicle accelerates still more, increasing pressure in the lines $G_1$ and $G_2$ moves the shift valve 391 to the left. Upon this occurrence the head 395 connects the line 260 to the line 400 which leads to the high clutch cylinder 47 and begins to engage the clutch 51. From the cylinder 47 the line connects to the shuttle valve 411 holding ball valve 412 to the right so that the oil under pressure passes into the second speed release chamber 416. The oil from line 400 also passes through line 400a into an auxiliary release chamber 420 to act upon the piston 421. This causes the piston 60 to move to the right against the pressure in chamber 61 to begin disengagement of the second speed ratio brake band 46.

At the same time, that is during the shift from second to high, the lock-up clutch is disengaged and the converter restored to action. This occurs because line 401 conducts oil under pressure from line 400 to the pressure limiting valve 401a in which the oil flows between the heads 402 and 404 and through port 406 to establish in the chamber 407 a reduced or limited pressure, as explained above. This overcomes governor pressure and moves the valve stem 375a to the right, closing the connection between the pressure line 260 and the lock-up clutch pressure line 13 and opening the line 13 to the exhaust 379. This, of course, removes the pressure in line 383 so that the pressure is relieved from the converter flow valve 311 and the pressure in chamber 300 shifts the converter flow valve to the right to thus establish a wide connection between chamber 300 and the converter inlet 304.

Therefore, it will be seen that during the shift the lock-up clutch is disengaged and torque is transmitted through the converter and this softens the action of the shift in the releasing of one friction device and engaging of the other.

Bear in mind that at this stage of the operation, the torque converter is transmitting the torque. Upon further increase of speed, the pressure in the line $G_1$ further increases to overcome the limited pressure in chamber 407 and shifts the clutch lock-up valve back to the left again to set the lock-up clutch and to reduce the flow of oil through the converter.

In a downshift from high to second the operation is just the reverse. As car speed drops the pressure in line $G_1$ drops and the lock-up clutch valve is shifted to the right by pressure in chamber 407, to restore the converter to action. Further, reduced governor pressure also allows the shift valve 391 to shift back to the position shown in FIG. 2, thus cutting off supply of oil to the high clutch line 400 and venting clutch 47, chamber 407 and release chambers 416 and 420 to disengage third speed and establish second speed.

At this point, it is well to note that the lock-up clutch valve has heads 380 and 381 of different size. Therefore, when this valve member has been opened, at a particular governor pressure, to establish a connection between line 260 and line 13, the greater force of the pressure on head 380 than on head 381 holds the valve open until the pressure in the line $G_1$ is lower than the above certain pressure, which represents a lower speed. Thus, for example, the lock-up clutch valve may open under pressure in line $G_1$ representing fifteen miles an hour, but will not close until there is a vehicle deceleration to say 11 or 12 miles an hour. These figures are exemplary only. Likewise the shift valve 391 has different sized heads 395 and 396 so that once it is opened it remains open until there is a substantial drop in the pressure in lines $G_1$ and $G_2$. This, of course, means a drop in vehicle speed.

If it is desired to operate the vehicle constantly in the second speed ratio the manual valve 252 is placed in the position marked $2^d$ in FIG. 11. This merely opens the shift valve lock-out line 261 to the main line 250 and pressurizes the chamber 398 at the left end of the shift valve and prevents the valve from opening under any circumstances.

To operate in the low speed ratio the operator shifts the manual valve to the L position of FIG. 2. This connects the main line 250 to the line 262 which leads to the low ratio cylinder 103 to engage the low brake. But, the second speed brake band 46 must be released. For this purpose, line 362 extends to the shuttle valve 411, passes into the same shifting the ball 412 to the left to close the line 400 so that the high clutch cannot be set. The oil thus flows through the shuttle valve line 415 and into second speed release chamber 416. Since the piston 60 is unbalanced, because of the spring 417, the combined load of the spring and oil pressure in chamber 416 shifts the piston 60 to the right as FIG. 11 is viewed thus disengaging the low speed brake band.

To operate in reverse the manual valve is shifted upwardly another notch to the reverse position marked R. At this time the head 255 lies between the connections of the line 250 and the line 260 and thus closes the main pressure line 250 off from the chamber 274. Thus, there is no pressure in lines 260, 261 or 262. These lines are vented through the check valve 275 and port 275a. At this time the head 256 closes the port 259 and a connection is established from line 250 into line 263 for conducting oil to the reverse speed ratio brake cylinder 116.

The inhibitor prevents the operator from manually downshifting at too high speed. For example, when operating in high speed ratio and at a high vehicle speed, the plunger 266 is shifted downwardly against both of the springs 269 and 270 and it blocks against the face 272 to prevent shift to second speed at such a high vehicle speed. When operating in locked second speed ratio the face 273 is in position to be blocked by the plunger 266 and thus a shift cannot be made to low speed ratio at too high a vehicle speed. The spring 269 acts on the plunger 266 at all times but when the pressure in the line $G_1$ increases the head 267 picks up the auxiliary springs 270.

It will be noted that the line 264 from the chamber 274 of the manual valve to the lock-up clutch valve so as to act upon the head 377 in a direction reverse to that of the action of the pressure in line $G_1$. This helps release the lock-up clutch. For example, when operating in low the head 254 is in a position above the line 262. In shifting from low to second, the head 254 moves to a position between line 261 and line 262 and line 262 vents through the restricted port 275a and the check valve 270 with its larger port. This retards the bleeding pressure and the pressure is transferred to the low lock-up clutch valve to help shift it to release the lock-up clutch and restore the converter for the shift from low to second.

The arrangement of having pressure from the governor valve in line $G_1$ active upon the main pressure regulator valve, serves to reduce the main line pressure with increase of speed in normal operation to thus save expenditure of power. At a relatively high speed of operation the pressure in line $G_1$ increases and is active upon the piston 296 and due to the different-sized piston areas the main line pressure on the left side of the pressure regulator valve member is relieved. Thus, the governor pressure on the head 283 urges the valve member to the left with greater effect than before so that the main line pressure is reduced as speed increases.

There is an overcontrol or kick-down effected by the throttle actuated valve 355. The shaft 368 turns with the throttle controlling mechanism, and after predetermined opening of the throttle, the key engages the end of the slot 369 and rocks the lever 367 clockwise as FIG. 11 is seen. The key and slot is merely diagrammatic of any suitable lost play connection. This pushes the valve member 366 against its spring and closes the connection in line $G_1$ between the governor valve and the lock-up clutch chambers 386 and 387 and the space on the right of land 396 of the shift valve 390. The neck 385 establishes a connection between the line $G_2$ through port $G_3$ and said chambers 386, 387 and space behind land 396. By thus reducing the pressure effective to hold the clutch lock-up valve open the lock-up clutch valve can be closed by the spring 378 and pressure in chamber 407. Therefore, by way of example, if the vehicle be operating, in the high speed ratio with the lock-up clutch engaged and the throttle is then widely opened, the lock-up clutch is released restoring transmission of torque through the torque converter without any change in the speed range in the gearing of the transmission. This increases the overall torque ratio of the transmission to provide acceleration in an emergency, for example. If thereafter car speed increases enough, increased governor pressure in line $G_2$ acting in chambers 386 and 387 can open the lock-up clutch valve to set the lock-up clutch again.

To briefly reiterate the overall action, the operator can make a selection in the operation of the manual valve. When a shift is made from one speed ratio to another and during the course of the shift the lock-up clutch disengages and the torque converter is restored to action. The shift is thus made with torque transmitted through the torque converter which softens and smooths the function. Thereafter the torque demand on the transmission may be reduced, as indicated by increasing car speed, and the lock-up clutch engages. Then, too, as is stated above when operating with the lock-up clutch engaged with a widely open throttle, the lock-up clutch can be manually disengaged and the torque converter restored to action to provide increased torque.

The steering of the vehicle is accomplished in a simple manner by combined and cooperative control of the vehicle brakes and the output clutches. By pulling evenly on the two levers 183 and 184 the brakes are applied. By pulling unevenly the driving clutches for the final drive members are selectively released or caused to slip. The double coned clutches soften the clutching action in making a gear shift. While operating constantly, the engine operated pumps for the cooling of the brakes, merely draw air when brakes are not applied thus resulting in saving of power. Moreover, the main line pressure is reduced in a normal high speed operation thus further saving expenditure of power.

I claim:

1. A transmission comprising in combination, a driving member connected by a torque-establishing device to a driven member; a source of fluid pressure; a first fluid pressure motor connectible to the source for operating the torque-establishing device; a governor which maintains a fluid pressure which is a measure of the speed of rotation of the driven member; and means normally tending to maintain constant the pressure in said first motor, said means including a valve movable in opposite direction a second fluid pressure motor in addition to said means, said second motor having a fluid connection with the first motor, a force-transmitting connection between the second motor and the valve so that the pressure in the second motor urges the valve in the direction to increase the pressure in the first motor, a third fluid pressure motor for interrupting the force-transmitting connection, and a fluid connection between the governor and the third motor to that at a predetermined speed of rotation of the driven member the third motor prevents the second motor from exerting force on the valve.

2. A transmission comprising in combination, a driving member connected by a torque-establishing device to a driven member; a source of fluid pressure; a fluid pressure motor connectible to the source for operating the torque-establishing device; a governor which maintains a fluid pressure which is a measure of the speed of rotation of the driven member; means for regulating the pressure in the motor including a pressure regulator valve movable in opposite directions and normally tending to maintain constant the pressure in said motor; a pressure boost chamber connected to the motor and including a movable wall; a strut between the movable wall and the valve by which pressure in the boost chamber urges the valve in the direction to increase pressure in the motor; a second pressure chamber including said movable wall and adapted to oppose the first chamber and prevent transmission of force between said wall and the strut; and a fluid connection between the second chamber and the governor so that at a predetermined speed of rotation of the driven member the movable wall is separated from the strut.

3. A transmission comprising in combination, a driving member connected by a torque-establishing device to a driven member; a source of fluid pressure; a fluid pressure motor connectible to the source for operating the torque-establishing device; a governor including a reducing valve which maintains a fluid pressure less than the pressure of the source and which is a measure of the speed of rotation of the driven member; means for regulating the pressure in the motor including a pressure regulator valve movable in opposite directions and normally tending to maintain constant the pressure in said motor; a pressure boost chamber connected to the motor and including a piston; a strut between the piston and the valve by which pressure in the boost chamber urges the valve in the direction to increase pressure in the motor; a second pressure chamber including a piston of larger diameter than the first piston and adapted to oppose the first piston; and a fluid connection between the second chamber and the governor so that at a predetermined speed of rotation of the driven member the second piston prevents the first piston from exerting force on the strut.

4. A transmission comprising in combination a driving member connected by a torque-establishing device to a driven member; a source of fluid pressure; a fluid pressure motor connectible to the source for operating the torque-establishing device, a governor including a reducing valve which maintains a fluid pressure less than the pressure of the source, which reduced pressure is a measure of the speed of rotation of the driven member; means for regulating the pressure in the motor including a pressure regulator valve movable in opposite directions and normally tending to maintain a substantially constant pressure in the motor; a first expansible pressure chamber connected to the governor and constantly urging the valve to decrease the pressure in the motor; a second expansible pressure chamber connectible to the motor and urging the valve to increase the pressure in the motor; and a third expansible pressure chamber connected to the governor and constantly opposing the force of the second expansible chamber on the valve.

5. A transmission comprising in combination a driving member connected by a torque-establishing device to a driven member; a source of fluid pressure; a fluid pressure motor connectible to the source for operating the torque-establishing device; a governor including a reducing valve which maintains a fluid pressure less than the pressure of the source, which reduced pressure is a measure of the speed of rotation of the driven member; means for regulating the pressure in the motor including a pressure regulator valve movable in opposite directions and normally tending to maintain a substantially constant pressure in the motor; a first expansible pressure chamber connected to the governor and constantly urging the valve to decrease the pressure in the motor; a second expansible pressure chamber connectible to the motor and urging the valve to increase the pressure in the motor; and a third expansible pressure chamber connected to the governor and constantly opposing the force of the second expansible chamber on the valve, said third chamber having a larger effective area than the second chamber so that at a predetermined speed of rotation of the driven member the third chamber prevents transmission of force between the second chamber and the valve.

References Cited in the file of this patent

UNITED STATES PATENTS

| 2,737,824 | Livermore | Mar. 13, 1956 |
| 2,756,851 | Collins | July 31, 1956 |

UNITED STATES PATENT OFFICE
CERTIFICATE OF CORRECTION

Patent No. 3,090,474                                                        May 21, 1963

Oliver K. Kelley

It is hereby certified that error appears in the above numbered patent requiring correction and that the said Letters Patent should read as corrected below.

Column 1, line 71, for "This" read -- Third --; column 8, line 18, after "264" insert -- extends --.

Signed and sealed this 10th day of December 1963.

(SEAL)
Attest:

ERNEST W. SWIDER

Attesting Officer

EDWIN L. REYNOLDS

Acting Commissioner of Patents